United States Patent [19]

Tai et al.

[11] Patent Number: 5,072,986
[45] Date of Patent: Dec. 17, 1991

[54] REMOTELY CONTROLLED GAS CAP ASSEMBLY

[76] Inventors: Wu D. Tai, 5-1 Fl., No. 1, Alley 18, Lane 38, Min Chuan E. Rd., Taipei; Chen Y. Tzei, No. 836, Chien Kung Rd., Kaohsiung; Shiau R. Jang, No. 10, Lane 48, Sec. 2, Chung Shan N. Rd., Taipei, all of Taiwan

[21] Appl. No.: 586,009

[22] Filed: Sep. 21, 1990

[51] Int. Cl.5 ............................................. B65D 45/00
[52] U.S. Cl. ................................... 296/97.22; 74/105; 49/340; 220/86.2; 220/335; 220/DIG. 33
[58] Field of Search .................... 74/102, 105; 49/339, 49/340, 344; 220/DIG. 33, 86.1, 86.2, 335; 257/228, 299, 58; 296/97.22

[56] References Cited

U.S. PATENT DOCUMENTS

| | | | |
|---|---|---|---|
| 1,572,049 | 2/1926 | Stephenson | 220/86.2 |
| 2,472,665 | 6/1949 | Ladner | 220/86.2 |
| 2,627,282 | 2/1953 | Comer | 74/105 |
| 3,750,825 | 8/1973 | Bachle | 296/97.22 X |
| 3,008,754 | 11/1961 | Fiala | 296/97.22 |
| 3,374,007 | 3/1968 | Ingolia | 296/97.22 X |
| 3,825,215 | 7/1974 | Borglum | 16/84 |
| 3,927,860 | 12/1975 | Smith et al. | 251/299 |
| 3,977,718 | 8/1976 | Nordberg | 49/340 |
| 3,991,523 | 11/1976 | Isaacson | 49/343 |
| 4,509,567 | 4/1985 | Harrison et al. | 220/86.2 |
| 4,598,496 | 7/1986 | Van Daele | 49/344 |
| 4,776,486 | 10/1988 | Mizusawa | 220/DIG. 33 |
| 4,782,978 | 11/1988 | Appleby et al. | 296/97.22 X |
| 4,811,763 | 3/1989 | Kupske | 220/86.2 |

FOREIGN PATENT DOCUMENTS

| | | | |
|---|---|---|---|
| 0694422 | 12/1930 | France | 251/228 |
| 0099418 | 6/1982 | Japan | 296/97.22 |
| 0202923 | 9/1986 | Japan | 296/97.22 |

*Primary Examiner*—Allan D. Herrmann
*Assistant Examiner*—Winnie Yip
*Attorney, Agent, or Firm*—Marger, Johnson, McCollom, Stolowitz

[57] ABSTRACT

A remotely controlled gas cap assembly includes a strip mounted around a fuel inlet of a fuel tank. The strip extends around the fuel inlet and has two spaced end plates which face each other. A transverse pivot pin is pivotally mounted on the two end plates. A link protruding from the pivot pin is attached to a bar having two sides each formed with an annular groove. The control assembly further has a remotely controllable pneumatic cylinder with a piston rod. The piston rod has a distal forked end which is comprised of two opposite branch rods. A roller is provided on an inner side of each branch rod which is received in a corresponding annular groove in each side of the bar and is movable along the annular groove. A gas cap is integrally formed with the link. A rubber block protrudes from an inner side of the gas cap. The gas cap is lifted to expose the fuel inlet when the piston rod is in a first position. The rubber block of the gas cap seals the fuel inlet when the piston rod is in a second position.

5 Claims, 2 Drawing Sheets 5,072,986

REMOTELY CONTROLLED GAS CAP ASSEMBLY

BACKGROUND OF THE INVENTION

The present invention relates to a remotely controlled gas cap assembly for an automobile, and more particulary to a pneumatic control assembly for remotely controlling the opening and closing of the gas cap when it is desired to refuel the automobile.

Conventionally, when an automobile reaches a gas station for refueling, the driver has to get out from the automobile to open the fuel tank lid with a key, and then open the gas cap of the fuel tank. After the automobile is filled with fuel, the driver puts the gas cap back and locks the fuel tank lid. These petty details are annoying.

Conventional technology includes a remote control assembly which provides a remote control of the fuel tank lid. By virtue of this conventional technology, the driver may open and close the fuel tank lid from the driver seat without having to get out. However, the gas cap still has to be manually removed during refueling. Furthermore, the driver has no assurance that the gas cap has been securely repositioned to seal the fuel tank after refueling. Consequently, in order to assure himself that the gas cap has been properly re-positioned, the driver usually ends up making a visual check of the gas cap, making the installation of the automatic assembly rather useless.

It is therefore a primary object of the present invention to provide a remote gas cap control assembly to mitigate and/or obviate the afore-mentioned problems.

SUMMARY OF THE INVENTION

According to the present invention, a remotely controlled gas cap assembly includes a strip mounted around a fuel inlet of a fuel tank. The strip extends around the fuel inlet and has two spaced end plates which face each other. A transverse pivot pin extends between the two end plates and is pivotally mounted on the two end plates. A link protruding from the pivot pin is attached to a bar having two sides, each formed with an annular groove.

The control assembly further has a remotely controllable pneumatic cylinder with a piston rod. The piston rod has a distal forked end which is comprised of two opposite branch rods. A roller, provided on an inner side off each branch rod, is received in a corresponding annular groove in each side of the bar and is movable along the annular groove. A gas cap is integrally formed with the link. A rubber block protrudes from an inner side of the gas cap. The gas cap is lifted to expose the fuel inlet when the piston rod is in a first position. The rubber block of the gas cap seals the fuel inlet when piston rod is in a second position.

The rubber block also has a rubber flange formed at a middle portion thereof such that the rubber flange reset on an outer edge of the fuel inlet to seal the fuel inlet when the gas cap covers the fuel inlet. The gas cap together with an outer surface of the body of the automobile to form a smooth surface when the gas cap covers the fuel inlet.

The present invention further provides an inner passage formed in the rubber block of the gas cap for equalizing the pressure inside the fuel tank with the outside.

The gas cap control assembly further provides an adjusting screw to a second end of the pneumatic cylinder so that the gas cap can be opened manually when the pneumatic cylinder does not function properly.

It is an object of the present invention to provide a remote control assembly for a gas cap of an automobile, in which a driver does not have to get out during refueling.

It is another object of the present invention to provide a remote control assembly for a gas cap of an automobile, in which a manual adjusting screw enables the user to manually open and close the gas cap when the control assembly does not function properly.

These additional objects, if not set forth specifically herein, will be readily apparent to those skilled in the art from the detailed description provided hereunder, with appropriate reference to the accompanying drawings.

DETAILED DESCRIPTION OF THE PREFERRED EMBODIMENTS

Figure 1:
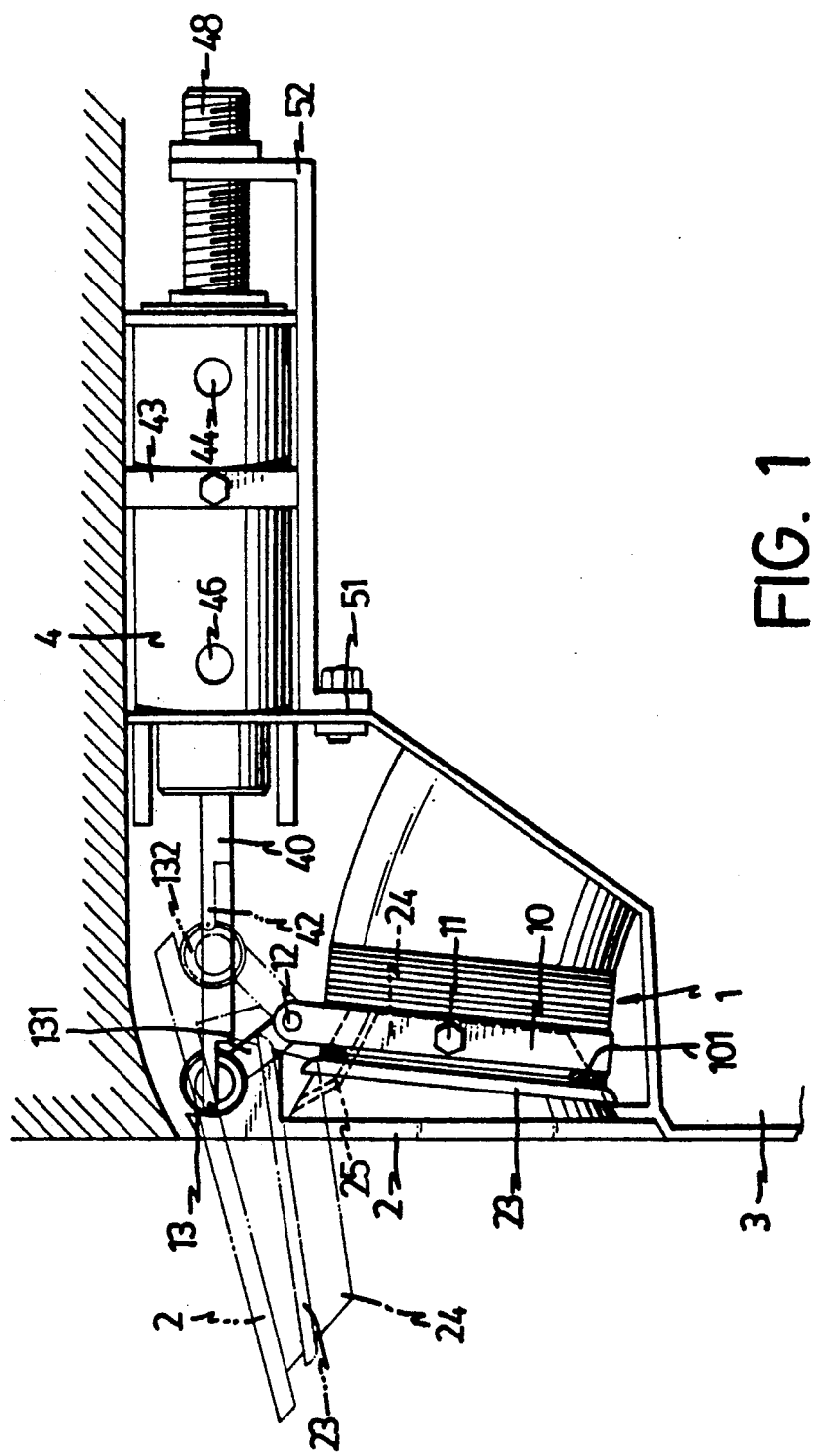
FIG. 1 is a schematic veiw of an automatic gas cap control assembly in accordance with the present invention.
Figure 2:
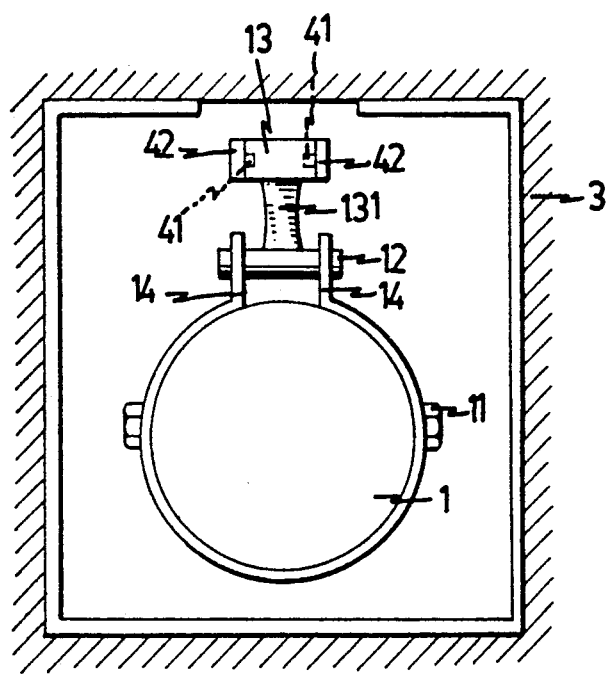
FIG. 2 is a left side veiw of FIG. 1, in which the gas cap is removed.

Referring to FIG. 1 and 2, the present remotely controlled gas cap assembly comprises a pneumatic cylinder 4 with two gas openings 44 and 46. The pneumatic cylinder 4 is securely attached, by a fixing plate 43, to an automobile frame 3 adjacent the fuel tank (not shown).

A strip 10 is mounted around a fuel inlet 1 of the fuel tank by a fastening means, such as screw nails 11. As shown in FIG. 2, the strip 10 extends around the fuel inlet 1 and has two spaced end plates 14 which face each other. Between the two end plates 14 is a transverse pivot pin 12 pivotally mounted on the two end plates 14. A first end of a link 131 protrudes from a middle portion of the pivot pin 12. A second end of the link 131 is attached to a middle portion of a bar 13. The bar 13 has two sides each formed with an annular groove 132 whose purpose will be illustrated later.

Figure 4:
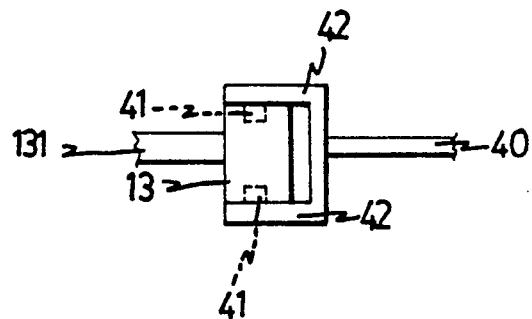
FIG. 4 is a top veiw showing the connection between the piston rod and a bar.

Still referring to FIGS. 1 and 2, and also to FIG. 4, a piston rod 40 protrudes from a first end of the pneumatic cylinder 4. The piston rod 40 has a distal forked end which is comprised of two opposite branch rods 42. On an inner side of each branch rod 42 there is provided a roller 41. Each roller 41 is received in the corresponding annular groove 132 in each side of the bar 13 and is movable along the annular groove.

A gas cap 2 is integrally formed with the link 131. The cap 2 includes a rubber block 24 protruding from an inner side thereof. The rubber block has a rubber flange 23 formed at a middle portion thereof such that when the cap 2 covers the refueling inlet, a part of the rubber block 24 (which is below the rubber flange 23) moves into the fuel inlet with the rubber flange against an outer edge of the fuel inlet, in order to seal the refueling inlet. When the cap 2 covers the fuel inlet 1, the gas cap 2 acts as a fuel tank lid and forms a smooth surface with the outer surface of the automobile body.

The pneumatic cylinder 4, through the two gas openings 44 and 46, communicates with a pneumatic system (not shown), like that used in a bus to pneumatically control the opening and closing of the door of the bus, for which, being so conventional, no further description is needed.

Figure 3:
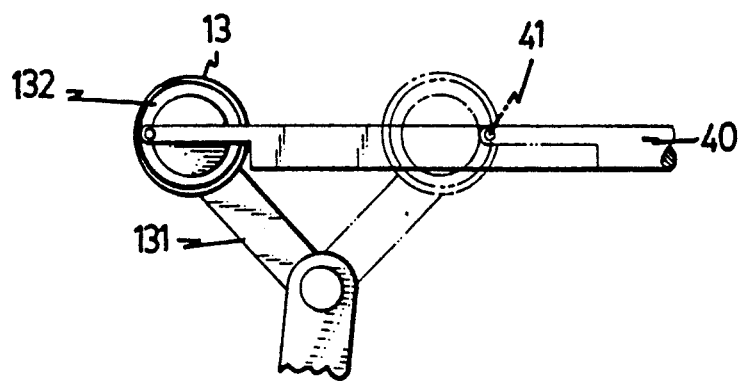
FIG. 3 Is a schematic view showing the operation of a piston rod which results in the opening and closing of a gas cap.

A driver in the driver seat may simply press an "OPEN" button installed on the dash board to move the piston rod 40 to a first position, as shown by the phantom line in FIGS. 1 and 3, in order to lift the cap 2 and open the inlet for refueling. The driver may also simply press another "CLOSE" button on the dash board to move the piston rod 40 to a second position, as shown by the soild line in FIGS. 1 and 3, to force the cap 2 to block the inlet. The rollers 41 acting within the annular grooves 132 assist in smoothly transforming the reciprocating movement of the piston rod 40 into pivotal movement of the link 131.

Referring to FIG. 1, a passage 25 through inside the block 24 blances the pressure between the inside of the fuel tank and outside, such that fuel may easily enter the carburetor (not shown) of the automobile. On an inner wall of the fuel inlet 1, an annular gasket 101 may be provided to cooperate with the rubber block 24 to assist in the seal of the fuel inlet 1.

An adjusting screw 48 is provided to the second end of the pneumatic cylinder 4 for manual operation when the pneumatic cylinder does not function properly. The adjusting screw 48 is secured and supported by suitable means, such as brackets 51, 52.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. A remotely controlled gas assembly for an automobile comprising:

a strip mounted around a fuel inlet of a fuel tank of the automobile, said strip extending around said fuel inlet and having two spaced end plates which face each other, a transverse pivot pin being pivotally mounted on said two end plates, a link protruding from a middle portion of said pivot pin at a first end thereof, a second end of said link being attached to a middle portion of a bar having two sides each formed with an annular groove;

a remotely controllable pneumatic cylinder mounted to a frame of the automobile;

a piston rod protruding from a first end of said pneumatic cylinder, said piston rod having a distal forked end which is comprised of two opposite branch rods, a roller being provided on an inner side of each branch rod, each roller being received in a corresponding annular groove in each side of said bar and being movable along said annular groove; and a gas cap being intergrally formed with said link, said gas cap comprising a rubber block protruding from an inner side thereof, said gas being lifted to expose said fuel inlet when said piston rod is in a first position, said rubber block of said gas cap sealing said fuel inlet when piston rod is in a second position.

2. A remotely controlled gas cap assembly as claimed in claim 1, wherein said rubber block has a rubber flange formed at a middle portion thereof such that said rubber flange rests on an outer edge of said fuel inlet to seal said fuel inlet when said gas cap covers said fuel inlet, said gas cap together with an outer surface of said automobile to form a smooth surface when gas cap covers said fuel inlet.

3. A remotely controlled gas cap assembly as claimed in claim 1, wherein an annular gasket is formed on an inner wall of said fuel inlet to cooperate with said rubber block to seal said fuel inlet when said piston rod is in said second position.

4. A remotely conntrolled gas cap assembly as claimed in claim 1, wherein an inner passage is formed in said rubber block of said gas cap for equalizing the pressure between the inside of the fuel tank and outside.

5. A remotely controlled gas assembly as claimed in claim 1, further comprising an adjusting screw provided to a second end of said pneumatic cylinder for manual operation when the pneumatic cylinder does not function properly.

* * * * *

UNITED STATES PATENT AND TRADEMARK OFFICE
CERTIFICATE OF CORRECTION

PATENT NO. : 5,072,986
DATED : December 17, 1991
INVENTOR(S) : Tai et al.

It is certified that error appears in the above-identified patent and that said Letters Patent is hereby corrected as shown below:

Column 1                  line 23, change "raev." to --raeve--;

Column 3                  line 11, change "solid" to --solid--.

Signed and Sealed this

Thirteenth Day of April, 1993

Attest:

STEPHEN G. KUNIN

*Attesting Officer*          *Acting Commissioner of Patents and Trademarks*